(12) United States Patent
Gafni et al.

(10) Patent No.: US 10,880,234 B2
(45) Date of Patent: Dec. 29, 2020

(54) CUT-THROUGH SWITCHING SYSTEM

(71) Applicant: MELLANOX TECHNOLOGIES TLV LTD., Raanana (IL)

(72) Inventors: Barak Gafni, Campbell, CA (US); Aviv Kfir, Nili (IL)

(73) Assignee: MELLANOX TECHNOLOGIES TLV LTD., Raanana (IL)

( * ) Notice: Subject to any disclaimer, the term of this patent is extended or adjusted under 35 U.S.C. 154(b) by 0 days.

(21) Appl. No.: 16/417,672

(22) Filed: May 21, 2019

(65) Prior Publication Data

US 2020/0374241 A1 Nov. 26, 2020

(51) Int. Cl.
*H04L 12/947* (2013.01)
*H04L 12/931* (2013.01)
*H04L 12/933* (2013.01)

(52) U.S. Cl.
CPC .......... *H04L 49/251* (2013.01); *H04L 49/103* (2013.01); *H04L 49/604* (2013.01)

(58) Field of Classification Search
CPC .................................................. H04L 49/251
See application file for complete search history.

(56) References Cited

U.S. PATENT DOCUMENTS

| | | | |
|---|---|---|---|
| 4,435,762 A | 3/1984 | Milligan et al. | |
| 7,561,567 B1* | 7/2009 | Olson | G06F 13/126 370/389 |
| 8,594,085 B2 | 11/2013 | Zuk et al. | |
| 9,582,440 B2 | 2/2017 | Gabbay et al. | |
| 9,641,465 B1 | 5/2017 | Gabbay et al. | |
| 2004/0179523 A1* | 9/2004 | Maruyama | H04L 47/31 370/389 |
| 2005/0129047 A1* | 6/2005 | Ku | H04L 49/90 370/428 |
| 2007/0143522 A1 | 6/2007 | Wilkinson et al. | |
| 2015/0117177 A1* | 4/2015 | Ganga | H04L 1/1621 370/216 |
| 2015/0318939 A1* | 11/2015 | Tsukamoto | H04J 3/0673 370/503 |
| 2020/0136940 A1* | 4/2020 | Gandham | G06T 11/206 |

FOREIGN PATENT DOCUMENTS

WO 2011067381 A1 6/2011

OTHER PUBLICATIONS

Wikipedia., "Cut-through switching", pp. 1-3, Mar. 24, 2019.

* cited by examiner

*Primary Examiner* — Edan Orgad
*Assistant Examiner* — Won Tae C Kim
(74) *Attorney, Agent, or Firm* — Kligler & Associates Patent Attorneys Ltd

(57) ABSTRACT

A method including receiving at a buffer at least a portion of an incoming frame, holding in the buffer the at least a portion of the frame received at the buffer, keeping in the buffer the at least a portion of the frame held in the buffer after transmission of the incoming frame by transmission circuitry responsive to receiving a signal at the buffer indicating that the at least a portion of a frame held in the buffer should be kept, and clearing from the buffer the at least a portion of a frame held in the buffer responsive to receiving a signal to the buffer indicating that the at least a portion of the frame held in the buffer should be cleared. Related methods and apparatus are also described.

22 Claims, 2 Drawing Sheets

CUT-THROUGH SWITCHING SYSTEM

FIELD OF THE INVENTION

The present invention relates to systems and methods for switching frames and/or packets, and particularly but not exclusively to systems and methods for cut-through switching of frames and/or packets.

BACKGROUND OF THE INVENTION

Cut-through switching, (which may also be termed herein cut-through forwarding) is a method in which a switch begins to switch or forward a frame or packet before the entire frame or packet has been received. Compared to store-and-forward switching, cut-through switching generally reduces latency through the switch. It is appreciated that this way of forwarding packets may introduce challenges, as not all the validity checks can be done by the switch before the switch starts to transmit the frame on the wire.

SUMMARY OF THE INVENTION

The present invention, in certain exemplary embodiments thereof, seeks to provide improved systems and methods for switching frames and/or packets, and particularly but not exclusively improved systems and methods for cut-through switching of frames and/or packets. Without limiting the generality of embodiments of the present invention, only one of the terms "frame" and "packet" (in various grammatical forms) may at times be used herein, it being appreciated that in general embodiments of the present invention are useable both with frames and with packets.

Frames traversing the network that were identified as defective, malformed, not valid or the like (such frames of all the listed types being termed herein "not valid") may be dropped by network devices, and may be of an interest for network operators as part of their network monitoring suites. In order for the network devices to be able to detect such frames, there are mechanisms embedded in the frames to protect the frames and/or to identify the frames as not valid. Some of the mechanisms known in the industry reside at the tail end of the frames/packets; those mechanisms are of interest in certain embodiments of the present invention. Examples of such mechanisms include: FCS for Ethernet frames; ICRC and VCRC for InfiniBand frames; and checksum for TCP and UDP packets (checksum resides in the header, but all of a packet needs to enter the network device in order for checksum to be verified, since checksum generally depends on most of a packet).

There is thus provided in accordance with an exemplary embodiment of the present invention a network element including input circuitry configured to receive an incoming frame, frame processing circuitry configured to process the incoming frame, frame validation circuitry configured to validate the incoming frame, transmission circuitry configured to transmit the incoming frame in accordance with signals received from the frame processing circuitry and the frame validation circuitry, a buffer configured to hold the incoming frame, and cut-through decision and hold circuitry configured: to send a signal to the buffer indicating that at least a portion of a frame held in the buffer should be kept upon transmission of the frame, in response to determining that the at least a portion of the frame held in the buffer should be kept, and to send a signal to the buffer indicating that the at least a portion of the frame held in the buffer should be cleared when the frame is valid, in response to determining that the at least a portion of the frame held in the buffer should be cleared, wherein the buffer is further configured to keep or to clear the at least a portion of the frame held therein, during or after transmission of the incoming frame by the transmission circuitry, based on the signal received from the cut-through decision and hold circuitry.

Further in accordance with an exemplary embodiment of the present invention the cut-through decision circuitry is configured to send the signal to the buffer indicating that the at least a portion of the frame held in the buffer should be kept in response to determining that the incoming frame is not valid.

Still further in accordance with an exemplary embodiment of the present invention the determining that the incoming frame is not valid is based, at least in part, on contents of a tail portion of the incoming frame.

Additionally in accordance with an exemplary embodiment of the present invention the determining that the incoming frame is not valid is based, at least in part, on contents of a header of the incoming frame.

Moreover in accordance with an exemplary embodiment of the present invention the at least a portion of the frame includes an entire frame.

Further in accordance with an exemplary embodiment of the present invention the at least a portion of a frame includes at least a portion of a header of the frame.

Still further in accordance with an exemplary embodiment of the present invention the transmission circuitry is configured to transmit the incoming frame when less than all of the incoming frame has been received by the input circuitry.

Additionally in accordance with an exemplary embodiment of the present invention the transmission circuitry is also configured to transmit the at least a portion of the frame held in the buffer to a collector.

Moreover in accordance with an exemplary embodiment of the present invention the collector is one of included in the network element, and remote to the network element.

Further in accordance with an exemplary embodiment of the present invention wherein the transmission circuitry is also configured to transmit metadata associated with the frame to the collector.

Still further in accordance with an exemplary embodiment of the present invention the network element includes a network interface card.

Additionally in accordance with an exemplary embodiment of the present invention the network element includes a switch.

There is also provided in accordance with another exemplary embodiment of the present invention a method including receiving at a buffer at least a portion of an incoming frame, holding in the buffer the at least a portion of the frame received thereat, keeping in the buffer the at least a portion of the frame held therein, after transmission of the incoming frame by transmission circuitry, responsive to receiving a signal at the buffer indicating that the at least a portion of a frame held in the buffer should be kept, and clearing from the buffer the at least a portion of a frame held therein responsive to receiving a signal to the buffer indicating that the at least a portion of the frame held in the buffer should be cleared.

Further in accordance with an exemplary embodiment of the present invention cut-through decision circuitry is configured to send the signal to the buffer indicating that the at least a portion of the frame held in the buffer should be kept in response to determining that the incoming frame is not valid.

Still further in accordance with an exemplary embodiment of the present invention the determining that the incoming frame is not valid is based, at least in part, on contents of a tail portion of the incoming frame.

Additionally in accordance with an exemplary embodiment of the present invention the determining that the incoming frame is not valid is based, at least in part, on contents of a header of the incoming frame.

Moreover in accordance with an exemplary embodiment of the present invention the at least a portion of the frame kept in the buffer includes an entire frame.

Further in accordance with an exemplary embodiment of the present invention the at least a portion of the frame kept in the buffer includes at least a portion of a header of the frame received at the buffer.

Still further in accordance with an exemplary embodiment of the present invention the transmission circuitry is configured to transmit the incoming frame when less than all of the incoming frame has been received by the input circuitry.

Further in accordance with an exemplary embodiment of the present invention the transmission also includes transmitting the at least a portion of the frame held in the buffer to a collector.

Still further in accordance with an exemplary embodiment of the present invention the transmission also includes transmitting metadata associated with the frame to the collector.

Additionally in accordance with an exemplary embodiment of the present invention the buffer and the transmission circuitry are included in a network interface card.

Moreover in accordance with an exemplary embodiment of the present invention the buffer and the transmission circuitry are included in a switch.

BRIEF DESCRIPTION OF THE DRAWINGS

The present invention will be understood and appreciated more fully from the following detailed description, taken in conjunction with the drawings in which.

DETAILED DESCRIPTION OF AN EMBODIMENT

Figure 1:
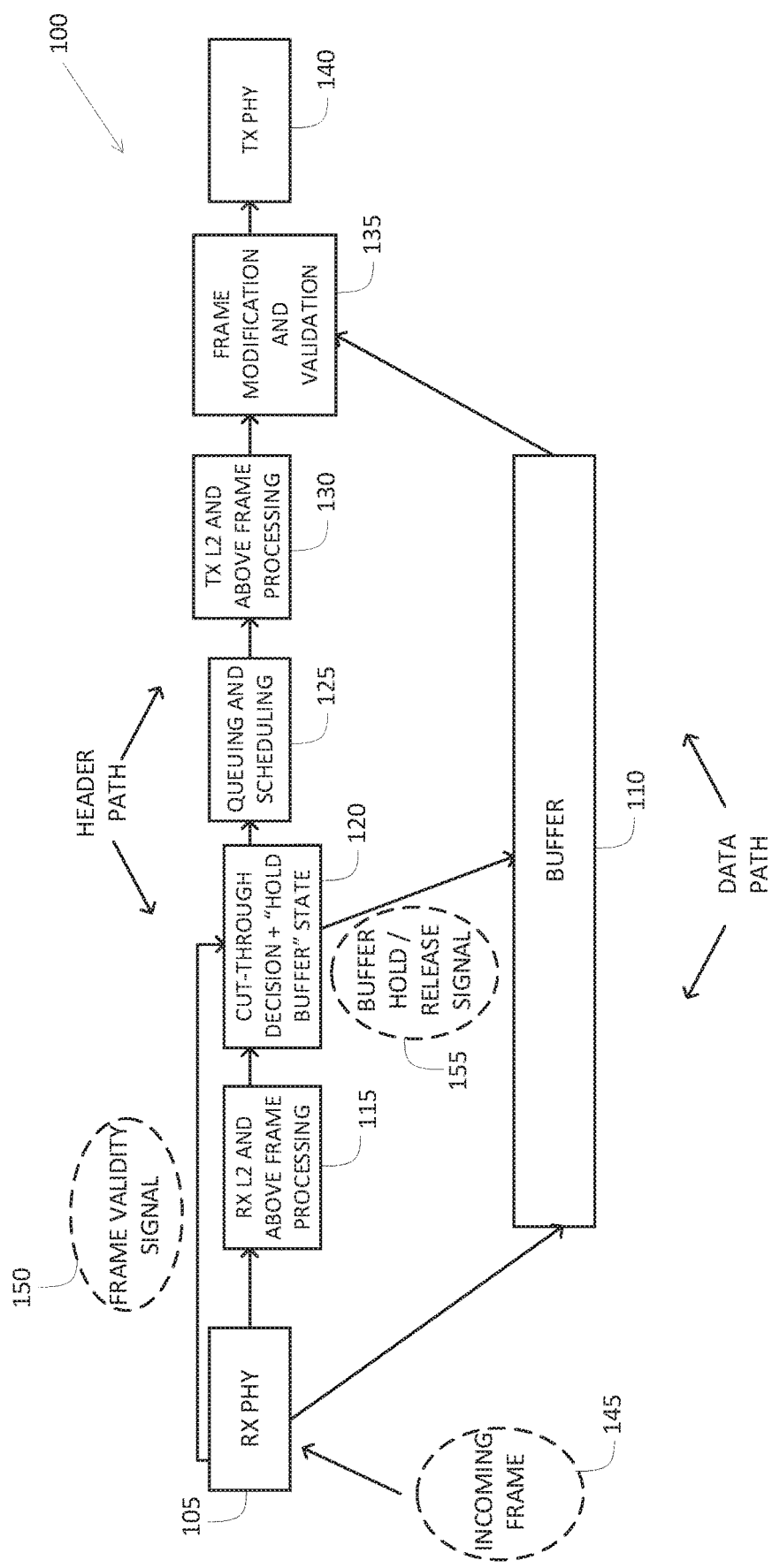
FIG. 1 is a simplified block diagram illustration of a system for switching frames and/or packets, constructed and operative in accordance with an exemplary embodiment of the present invention.

Reference is now made to FIG. 1 which is a simplified block diagram illustration of a system for switching frames and/or packets, constructed and operative in accordance with an exemplary embodiment of the present invention.

The system of FIG. 1, generally designated 100, may be comprised in an appropriate switch, router, or Network Interface Controller (NIC). In general, a switch, router, or NIC may be termed herein a "network element"; and the terms "switch" and "router" may be used interchangeably herein. By way of non-limiting example, systems commercially available from Mellanox Technologies Ltd. which might be appropriate network elements include: Spectrum systems, such as the SN2700 system, and ConnectX-5 systems.

The system of FIG. 1, generally designated 100, comprises the following elements, generally implemented in appropriate circuitry:

physical reception circuitry 105;
a buffer 110;
reception circuitry for L2 and above frame processing 115;
cut through decision and "hold buffer" state circuitry 120;
queuing and scheduling circuitry 125;
transmission circuitry for L2 and above frame processing 130;
frame (or packet) modification and validation circuitry 135; and
physical transmission circuitry 140.

The term "L2" as used herein refers to layer 2 of the OSI model; layer 2 of the OSI model may also be referred to as a/the "MAC layer".

An exemplary mode of operation of the system of FIG. 1 is now briefly described.

An incoming packet or frame (without limiting the generality of the exemplary embodiment of FIG. 1, referred to in the remainder of the description and claims as a "frame") 145, from outside the system of FIG. 1, begins to be received at the physical reception circuitry 105. As the incoming frame 145 begins to be received, portions of the incoming frame 145, typically all or part of a header thereof, are sent on by the physical reception circuitry 105 to the reception L2 and above frame processing circuitry 115, where (as is known in the art) processing of switching information at L2 and above takes place. L2 and above (in certain exemplary embodiments, L2 and L3) processing of an incoming frame, such as the incoming frame 145, is known in the art. The term "header", as used herein, denotes a portion (bytes) of a frame that are used by a network element in order to make a forwarding decision. A path in which the header is passed on from the physical reception circuitry 105 is labeled in FIG. 1 as "header path"

As the incoming frame 145 continues to be received, the incoming frame 145 is also passed (generally in its entirety) by the physical reception circuitry 105 to the buffer 110. A path in which the incoming frame 145 is passed (generally in its entirety) is labeled in FIG. 1 as "data path".

The portion or entirety of the header of the incoming frame 145 is passed from the reception L2 and above frame processing circuitry 115 to cut-through decision and "hold buffer" state circuitry 120. The cut-through decision and "hold buffer" state circuitry 120 is configured to perform at least the following:

1. To decide whether or not the incoming frame 145 can be processed using cut-through switching or not. Adaptive switching may be used, in which a dynamic decision is made as to whether to use cut-through or to use store-and forward; such a decision may be based on current network conditions. In the case of the exemplary mode of operation described herein for the exemplary system of FIG. 1, a dynamic decision on whether to use cut-through or to use store-and-forward is made by the cut-through decision and "hold buffer" state circuitry 120.

2. To decide whether the incoming frame 145, as stored in the buffer 110, should be retained or should be discarded from the buffer 110 (which discarding may take place immediately or substantially immediately) during the read of the buffer for the purpose of transmitting the frame, after the incoming frame 145 is eventually sent on to its destination, as further described below. As described above, certain frames should be dropped; frames which are not valid are an example of such frames. In order for the system of FIG. 1 to be able to detect such frames, there are mechanisms embedded in the frames to protect the frames and/or to identify the frames as not valid. Some of the mechanisms known in the industry reside at the tail end of the frames/packets; those mechanisms are of interest in certain embodiments of the present invention. Non-limiting examples of such mechanisms include: FCS for Ethernet frames; ICRC and VCRC for InfiniBand frames; and checksum for TCP and UDP packets (checksum resides in the header, but persons skilled in the art will appreciate that all of a packet needs to enter the system of FIG. 1 in order for checksum to be verified, since checksum depends on an entire packet). Specifically, when all of the incoming frame 145 has entered the physical reception circuitry 105, the physical reception circuitry 105 determines, using the appropriate mechanism for the given frame, whether the frame is not valid, and sends a frame validity signal 150 to the cut-through decision and "hold buffer" state circuitry 120. If the incoming frame 145 is not valid, the frame validity signal 150 will indicate that the incoming frame 145 is not valid, and vice versa. The cut-through decision and "hold buffer" state circuitry 120 then sends, responsive to receipt of the frame validity signal 150, a buffer hold/release signal 155 to the buffer 110.

If the frame validity signal 150 indicates that the incoming frame is not valid, then the buffer hold/release signal 155 indicates "hold"; the incoming frame 145 should be held in the buffer 110 for further processing. If, on the contrary, the frame validity signal 150 indicates that the incoming frame is valid, then the buffer hold/release signal 155 indicates "release"; the incoming frame 145 may be cleared from the buffer 110 once the incoming frame 145 has been sent on to its intended destination. The buffer hold/release signal 155 may be configuration-dependent so that, for example, in the above description of hold and release, it is appreciated that the system of FIG. 1 may be configured (such as, by way of non-limiting example, by an administrator thereof) to not hold incoming frames as described herein, but rather to process such packets "normally", in a manner known in the art, when so configured. In such a case of configuration to not hold incoming frames, the buffer hold/release signal 155 may not be sent, or might always indicate "release".

The cut-through decision and "hold buffer" state circuitry 120 meanwhile passes the portion or entirety of the header of the incoming frame 145 on to the transmission circuitry for L2 and above frame processing 130, where (similarly to the reception circuitry for L2 and above frame processing 115, but in the context of transmission) processing of switching information at L2 and above takes place, as is known in the art.

The portion or entirety of the header of the incoming frame 145 is then passed on to the frame modification and validation circuitry 135, where the incoming frame 145 is also received from the buffer 110, and passed on for transmission to a destination (not shown) by the physical transmission circuitry 140. The frame modification and validation circuitry is also configured to carry out further operations, as described below.

A frame which has been held in the buffer 110 (by way of non-limiting example, due to being not valid, as described above) may have metadata added to the frame in order to enable later analysis of the frame and the reason/s for which the frame was held. For example, the following are non-limiting examples of metadata that could be added:
- an identifier of an ingress port (not shown) from which the frame entered the system of FIG. 1;
- an identifier of an egress port (not shown) from which the frame exited the system of FIG. 1;
- an ingress timestamp, indicating a time at which the frame entered the ingress port (not shown) or the system of FIG. 1;
- an egress timestamp, indicating a time at which the frame exited the egress port (not shown) or the system of FIG. 1;
- calculated value (not matching expected value as indicated in the frame) of an appropriate mechanism indicating that the frame is not valid (as described above, non-limiting examples of such mechanisms include: FCS for Ethernet frames; ICRC and VCRC for InfiniBand frames; and checksum for TCP and UDP);
- network device identifier of the system of FIG. 1; and
- amount of frame data transmitted from the device of FIG. 1 before the frame was identified as not valid.

The metadata may be added by the frame modification and validation circuitry 135. The metadata added by the frame modification and validation circuitry 135 may originate in other elements of the system of FIG. 1, in accordance with the type of metadata. By way of non-limiting example, in the case of calculated value, not matching expected value, of the mechanism indicating that the frame is not valid, the metadata may originate with the physical reception circuitry 105, and may be comprised in the frame validity signal 150. Similarly, an ingress time stamp to a port (not shown) may be provided by the port. In general, the metadata may be stored in an appropriate element of the system of FIG. 1 such as, by way of non-limiting example, in the buffer 110, adjacent to or otherwise associated with the data of the incoming frame 145 which is stored in the buffer 110.

It is appreciated that the modification functions of the frame modification and validation circuitry as described above may, in some exemplary embodiments, be optional or may be optionally used, according to system configuration. Such modification functions include addition of metadata, as described above.

In general, it may be desirable for the not valid frame itself, along with associated metadata, to be sent to a collector, which could be directly connected to the system of FIG. 1 (not shown), or could be located at a network location local or remote to the system of FIG. 1; such collectors are known in the art. In the case of a collector at a network location, the frame modification and validation circuitry 135 may also encapsulate and add header information, as needed, so that the not valid frame and associated metadata could be sent to the network location.

It is appreciated that the elements shown and described with reference to FIG. 1 may be variously arranged. For example, and without limiting the generality of the foregoing, each egress port (not shown) could have an egress port buffer similar to the buffer 110 and could hold each frame in the egress port buffer until receiving a signal (similar to the buffer hold/release signal 155 of FIG. 1), indicating whether the frame may be released, or should be processed as indicated above in the case of a not valid frame.

Figure 2:
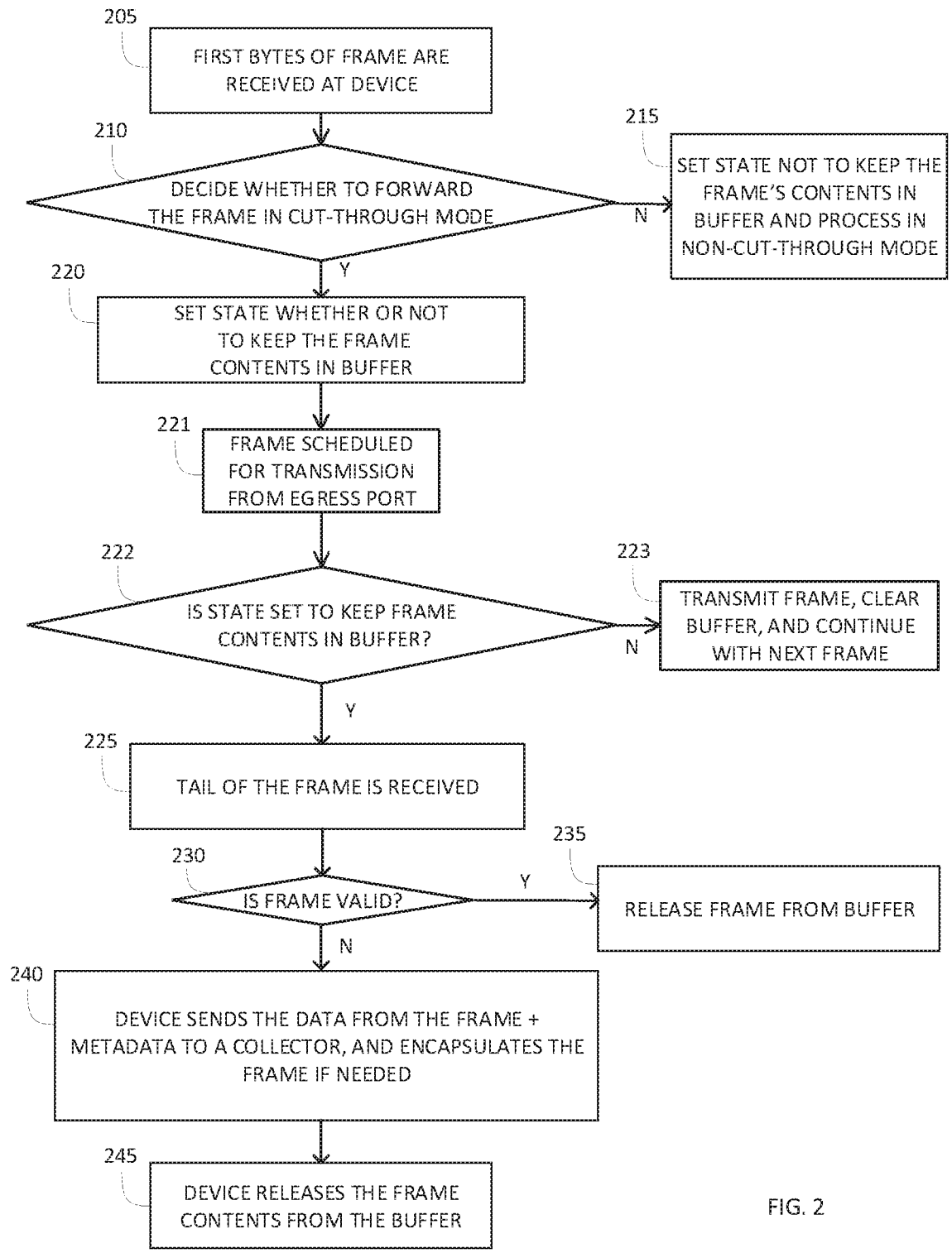
FIG. 2 is a simplified flowchart illustration of an exemplary method of operation of the system of FIG. 1.

Reference is now made to FIG. 2, which is a simplified flowchart illustration of an exemplary method of operation of the system of FIG. 1.

The exemplary method of FIG. 2 comprises the following steps:

First bytes of a frame (such as, by way of non-limiting example, the incoming frame 145 of FIG. 1) are received at the system of FIG. 1. (step 205)

A decision is made (as described in detail above with reference to FIG. 1) as to whether or not the frame being received can be forwarded in cut-through mode (step 210). If "yes", the method continues at step 220. If "no", a state of the system is set so that the frame's contents will not be retained in a buffer (such as, by way of non-limiting example, the buffer 110 of FIG. 1) after processing, and processing of the frame continues in non-cut-through mode (which non-cut-through mode processing may take place as is known in the art, such processing not being shown or described herein for simplicity of depiction and description). (step 215)

A state of the system is set so that the frame's contents will be retained in a buffer (such as, by way of non-limiting example, the buffer 110 of FIG. 1) after processing. (step 220).

As the frame continues to be received and a point is reached at which the frame is scheduled for transmission from an egress port (step 221), a check is made as to whether the state has been set to retain the frame's contents in the buffer (step 222). If the state is g set, processing continues with transmission of the frame, clearing of the buffer, and receipt and processing of a next frame (step 223); in such a case, the remaining steps of the method of FIG. 2 are not executed.

If the state is set, the entirety of the frame is received, through and including a tail of the frame (step 225), at which time frame validity can be determined (step 225); exemplary methods for determining frame validity are described above with reference to FIG. 1.

If the frame is determined to be valid (step 230), the frame is released from the buffer (such as, by way of non-limiting example, the buffer 110 of FIG. 1) in step 235. As described above with reference to FIG. 1, if the frame is determined to not be valid, the system sends the data from the frame, plus appropriate metadata, to a collector, and encapsulates the frame as needed before sending (step 240). The frame is then released from the buffer (step 245).

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product or on a tangible medium. In some cases, it may be possible to instantiate the software components as a signal interpretable by an appropriate computer, although such an instantiation may be excluded in certain embodiments of the present invention.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A network element comprising:
 input circuitry configured to receive an incoming frame;
 frame processing circuitry configured to process the incoming frame;
 frame validation circuitry configured to validate the incoming frame;
 transmission circuitry configured to transmit the incoming frame in accordance with signals received from the frame processing circuitry and the frame validation circuitry;
 a buffer configured to hold the incoming frame; and
 cut-through decision and hold circuitry configured:
  to send a signal to the buffer indicating that at least a portion of a frame held in the buffer should be kept upon transmission of the frame, in response to determining that said at least a portion of the frame held in the buffer should be kept; and
  to send a signal to the buffer indicating that said at least a portion of the frame held in the buffer should be cleared when the frame is valid, in response to determining that said at least a portion of the frame held in the buffer should be cleared,
 wherein the buffer is further configured to keep or to clear said at least a portion of the frame held therein, during or after transmission of the incoming frame by the transmission circuitry, based on the signal received from the cut-through decision and hold circuitry.

2. The network element according to claim 1, and wherein said cut-through decision and hold circuitry is configured to send said signal to the buffer indicating that said at least a portion of the frame held in the buffer should be kept in response to determining that said incoming frame is not valid.

3. The network element according to claim 2, and wherein said determining that said incoming frame is not valid is based, at least in part, on contents of a tail portion of said incoming frame.

4. The network element according to claim 2, and wherein said determining that said incoming frame is not valid is based, at least in part, on contents of a header of said incoming frame.

5. The network element according to claim 1, and wherein said at least a portion of the frame comprises an entire frame.

6. The network element according to claim 1, and wherein said at least a portion of a frame comprises at least a portion of a header of said frame.

7. The network element according to claim 1, and wherein said transmission circuitry is configured to transmit the incoming frame when less than all of said incoming frame has been received by said input circuitry.

8. The network element according to claim 1, and wherein said transmission circuitry is also configured to transmit said at least a portion of the frame held in the buffer to a collector.

9. The network element according to claim 8 and wherein said collector is one of: comprised in the network element; and remote to the network element.

10. The network element according to claim 8 and wherein said transmission circuitry is also configured to transmit metadata associated with the frame to said collector.

11. The network element according to claim 1, and wherein said network element comprises a network interface card.

12. The network element according to claim 1, and wherein said network element comprises a switch.

13. A method comprising:
 receiving at a buffer at least a portion of an incoming frame;
 holding in said buffer said at least a portion of said frame received thereat;
 keeping in said buffer said at least a portion of said frame held therein, after transmission of said incoming frame by transmission circuitry, responsive to receiving a signal at said buffer indicating that said at least a portion of a frame held in said buffer should be kept; and
 clearing from said buffer said at least a portion of a frame held therein responsive to receiving a signal to said buffer indicating that said at least a portion of the frame held in said buffer should be cleared, wherein cut-through decision circuitry is configured to send said signal to said buffer indicating that said at least a portion of the frame held in said buffer should be kept in response to determining that said incoming frame is not valid.

14. The method according to claim 13, and wherein said determining that said incoming frame is not valid is based, at least in part, on contents of a tail portion of said incoming frame.

15. The method according to claim 13, and wherein said determining that said incoming frame is not valid is based, at least in part, on contents of a header of said incoming frame.

16. The method according to claim 13, and wherein said at least a portion of said frame kept in said buffer comprises an entire frame.

17. The method according to claim 13, and wherein said at least a portion of the frame kept in said buffer comprises at least a portion of a header of said frame received at said buffer.

18. The method according to claim 13, and wherein said transmission circuitry is configured to transmit the incoming frame when less than all of said incoming frame has been received by said input circuitry.

19. The method according to claim 13, and wherein said transmission also comprises transmitting said at least a portion of the frame held in the buffer to a collector.

20. The method according to claim 19 and wherein said transmission also comprises transmitting metadata associated with the frame to said collector.

21. The method according to claim 13, and wherein said buffer and said transmission circuitry are comprised in a network interface card.

22. The method according to claim 13, and wherein said buffer and said transmission circuitry are comprised in a switch.

* * * * *